United States Patent
Kiwan et al.

(10) Patent No.: US 11,629,657 B2
(45) Date of Patent: Apr. 18, 2023

(54) SYSTEM AND METHOD FOR OPERATING AN ENGINE IN A FUEL CUT-OUT MODE

(71) Applicant: Ford Global Technologies, LLC, Dearborn, MI (US)

(72) Inventors: Rani Kiwan, Canton, MI (US); Gopichandra Surnilla, West Bloomfield, MI (US); Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 17/451,471

(22) Filed: Oct. 19, 2021

(65) Prior Publication Data

US 2022/0034271 A1 Feb. 3, 2022

Related U.S. Application Data

(63) Continuation of application No. 16/839,405, filed on Apr. 3, 2020, now Pat. No. 11,215,129.

(51) Int. Cl.
*F02D 41/00* (2006.01)
*F02M 26/05* (2016.01)

(52) U.S. Cl.
CPC ......... *F02D 41/0007* (2013.01); *F02M 26/05* (2016.02); *F02D 41/005* (2013.01); *F02D 41/0077* (2013.01); *F02D 2041/001* (2013.01); *F02D 2041/0017* (2013.01); *F02D 2200/0406* (2013.01)

(58) Field of Classification Search
CPC ........ F02M 26/05; F02M 26/17; F02M 26/45; F02M 26/65; F02M 35/104; F02D 41/0007; F02D 41/005; F02D 41/0077; F02D 2041/001; F02D 2041/0017; F02D 2200/0406; F02D 13/06; F02D 41/0082; F02D 41/0087; F02D 41/123; F02D 41/126; F02D 13/0203; F01N 3/022; F01N 3/101

See application file for complete search history.

(56) References Cited

U.S. PATENT DOCUMENTS

| | | | |
|---|---|---|---|
| 7,159,551 B2 | 1/2007 | Cecur et al. | |
| 7,404,383 B2 | 7/2008 | Elendt | |
| 9,605,603 B2 | 3/2017 | Glugla et al. | |
| 11,085,385 B2 * | 8/2021 | Ulrey | F02D 41/1475 |
| 11,156,176 B2 * | 10/2021 | Ulrey | F01N 3/10 |
| 2015/0285202 A1 | 10/2015 | Spohn et al. | |
| 2016/0290254 A1 | 10/2016 | Nozaki | |
| 2017/0218826 A1 | 8/2017 | Uhrich et al. | |
| 2017/0321617 A1 | 11/2017 | Kalluri et al. | |
| 2018/0038257 A1 | 2/2018 | Uhrich et al. | |
| 2018/0171887 A1 * | 6/2018 | Ulrey | F01N 13/107 |
| 2020/0122709 A1 * | 4/2020 | Cunningham | F02D 13/0207 |
| 2021/0310429 A1 * | 10/2021 | Kiwan | F02D 41/123 |

FOREIGN PATENT DOCUMENTS

EP 2495419 A1 9/2012

* cited by examiner

*Primary Examiner* — J. Todd Newton
(74) *Attorney, Agent, or Firm* — Vincent Mastrogiacomo; McCoy Russell LLP

(57) ABSTRACT

Methods and systems for operating an engine that includes adjustable poppet valve timing and an exhaust gas recirculation valve are described. In one example, the exhaust gas recirculation valve is opened and the timing of the poppet valves is retarded so that an amount of fresh air that is pumped by the engine to an after treatment device may be reduced.

20 Claims, 5 Drawing Sheets

SYSTEM AND METHOD FOR OPERATING AN ENGINE IN A FUEL CUT-OUT MODE

CROSS REFERENCE TO RELATED APPLICATIONS

The present application is a continuation of U.S. Non-Provisional patent application Ser. No. 16/839,405, entitled "SYSTEM AND METHOD FOR OPERATING AN ENGINE IN A FUEL CUT-OUT MODE", and filed on Apr. 3, 2020. The entire contents of the above-listed application are hereby incorporated by reference for all purposes.

BACKGROUND/SUMMARY

A vehicle's engine may be operated in a fuel cut-out mode when vehicle speed is greater than a threshold speed and when driver demand torque is less than a threshold torque. The fuel cut-out mode may include rotating the engine without supplying fuel to the engine. The engine may continue to rotate via delivering torque from the vehicle's wheels to the engine. The vehicle's kinetic energy may supply the torque to rotate the vehicle's wheels and the engine. Operating the engine in fuel cut-out mode may reduce fuel consumption since fuel is not consumed by the engine to sustain engine rotation. However, the reduction in fuel consumption may not be without cost. In particular, rotating the engine without supplying fuel to the engine may cause the engine to pump fresh air to an exhaust after treatment device (e.g., a catalyst). The excess air that is introduced to the after treatment device may disturb a balance of oxidants and reductants in the after treatment device such that if the engine is reactivated, NOx generated by the engine may break through the after treatment device without being reduced to $N_2$ and $O_2$. The balance of oxidants and reductants may be reestablished after exiting fuel cut-out mode via combusting rich air-fuel ratios in engine cylinders or by injecting fuel during an exhaust stroke of a cylinder. Thus, at least a portion of the fuel conserved by operating the engine in the fuel cut-out mode may be used to ensure engine emissions standards are met. As a result, operating the engine in fuel cut-out mode may not be as beneficial as may be desired. Therefore, it may be desirable to provide a way of operating an engine in a fuel cut-out mode such that less fuel may be applied to reactivate the after treatment device to a desired operating state.

The inventors herein have recognized the above-mentioned disadvantages and have developed an engine operating method, comprising: adjusting intake valve closing timing and opening an exhaust gas recirculation (EGR) valve via a controller in response to an engine entering a fuel cut-out mode.

By adjusting intake valve closing timing and opening an EGR valve in response to an engine entering a fuel cut-out mode, it may be possible to reduce an amount of fresh air and oxygen that may be pumped by the engine to an exhaust after treatment device. Consequently, it may be possible to reactivate the after treatment device using less fuel as compared to not adjusting intake valve closing timing and not opening the EGR valve. Reactivating the after treatment device may allow the after treatment device to reduce exhaust emissions (e.g., NOx) with greater efficiency.

The present description may provide several advantages. In particular, the approach may reduce fuel consumption by an engine. In addition, the approach may reduce cooling of an after treatment device so that the after treatment device may operate more efficiently. Further, the approach may improve after treatment device efficiency after entering an engine fuel cut-out mode or after stopping rotation of an engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
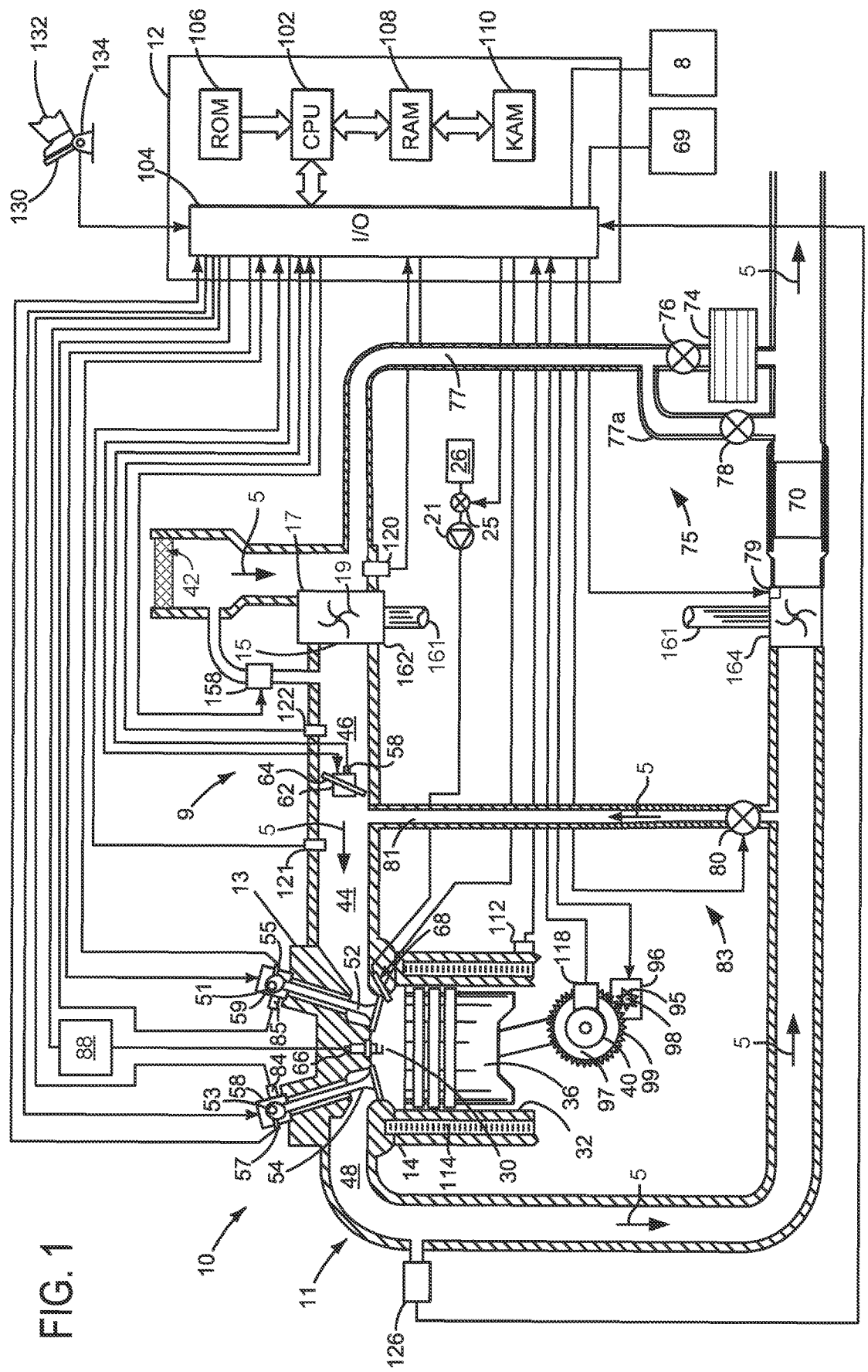
FIG. 1 shows a detailed schematic depiction of an example engine.
Figure 2:
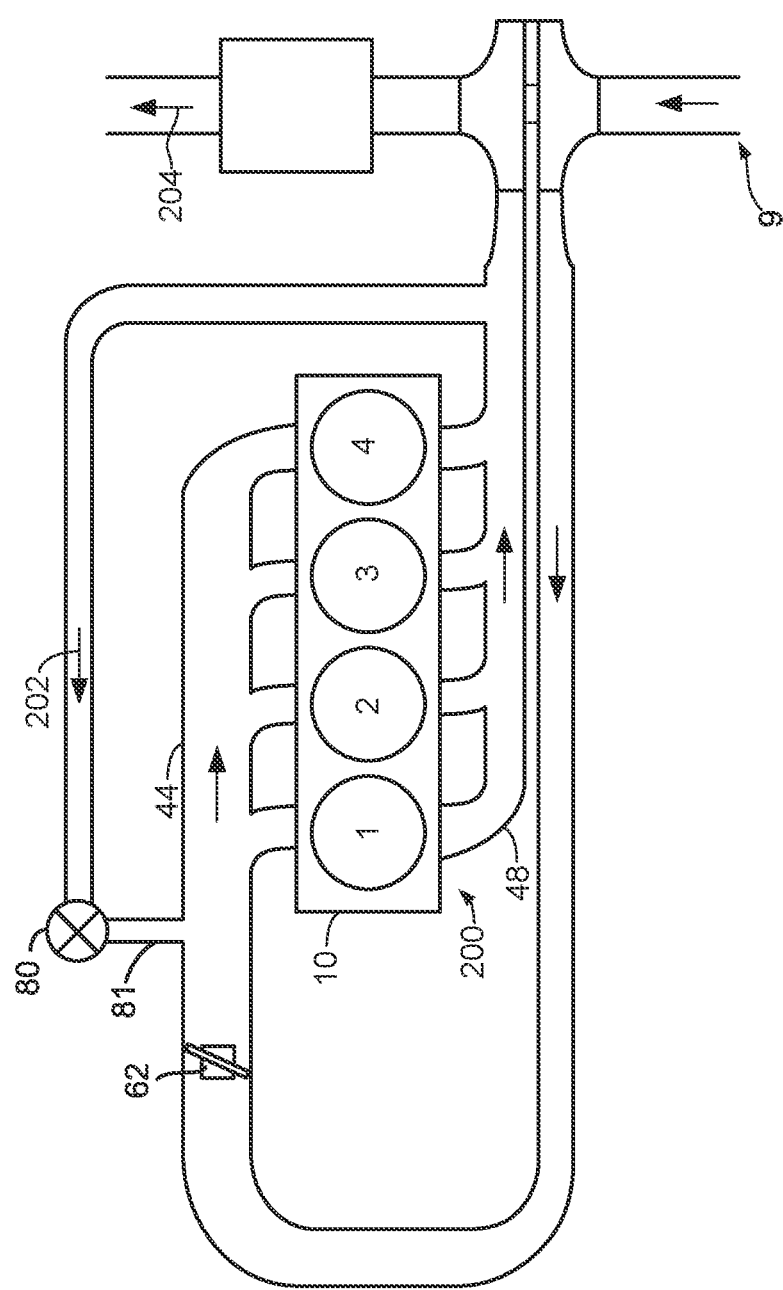
FIGS. 2 and 3 show example engine configurations.
Figure 3:
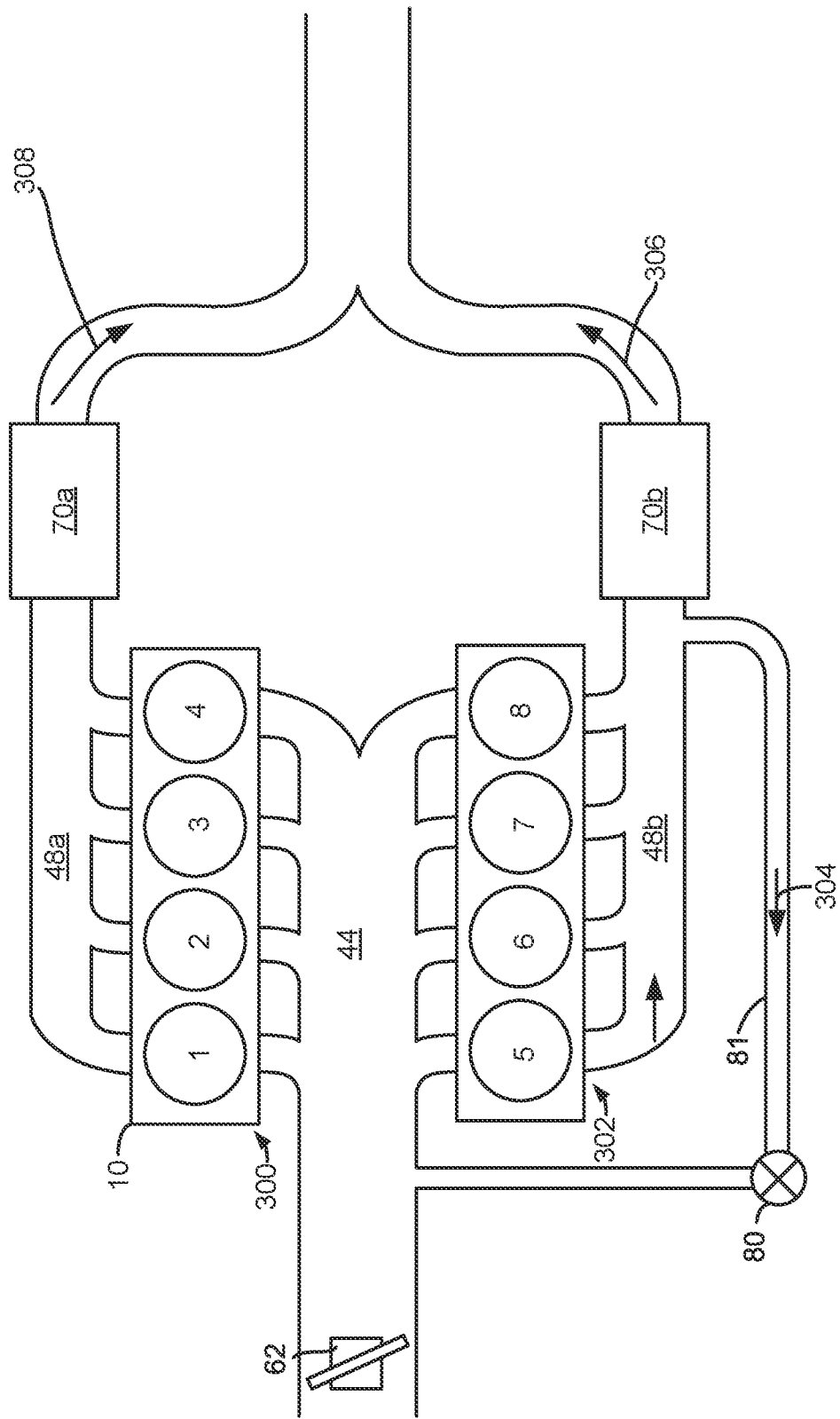
Figure 4:
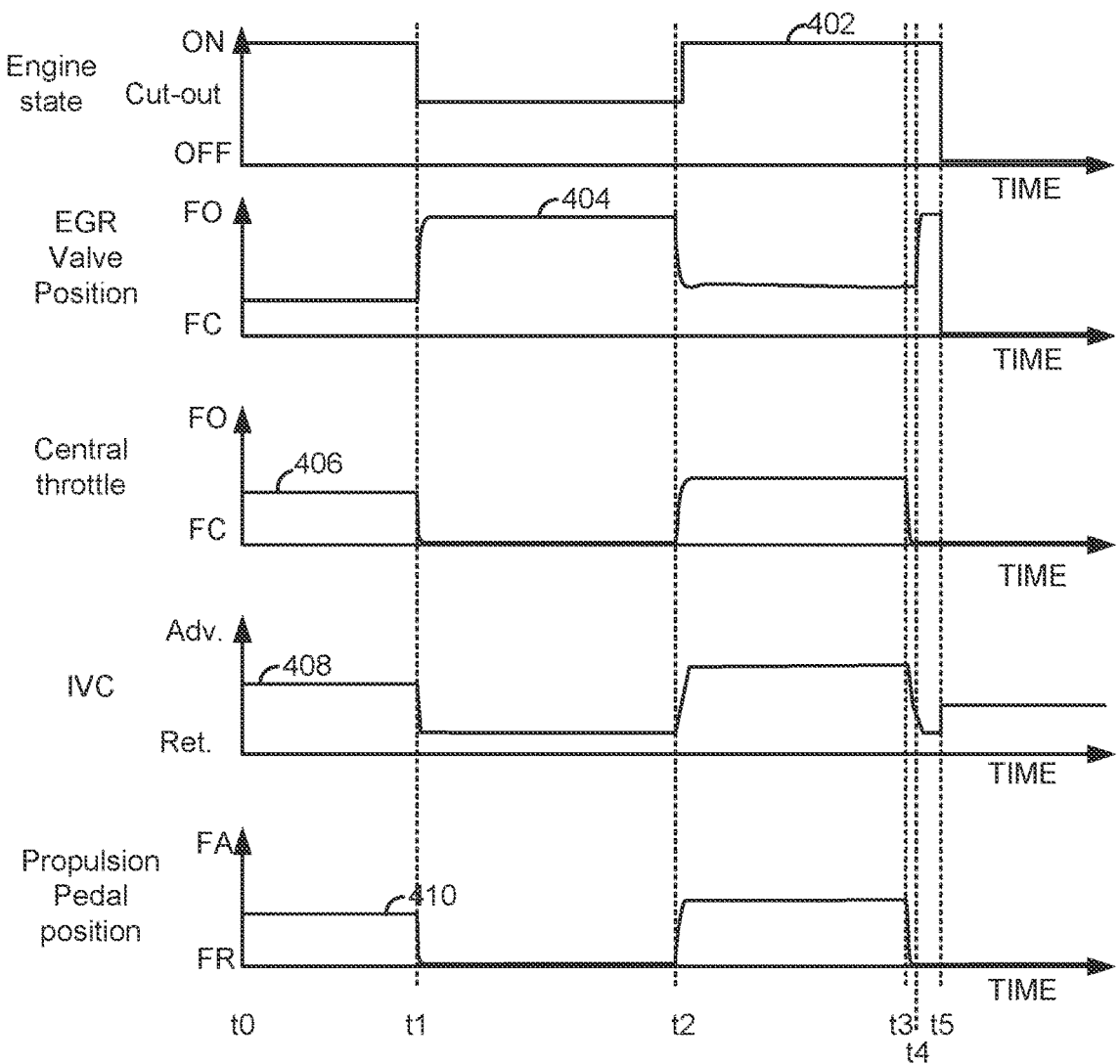
FIG. 4 shows an example engine operating sequence according to the method of FIG. 5.
Figure 5:
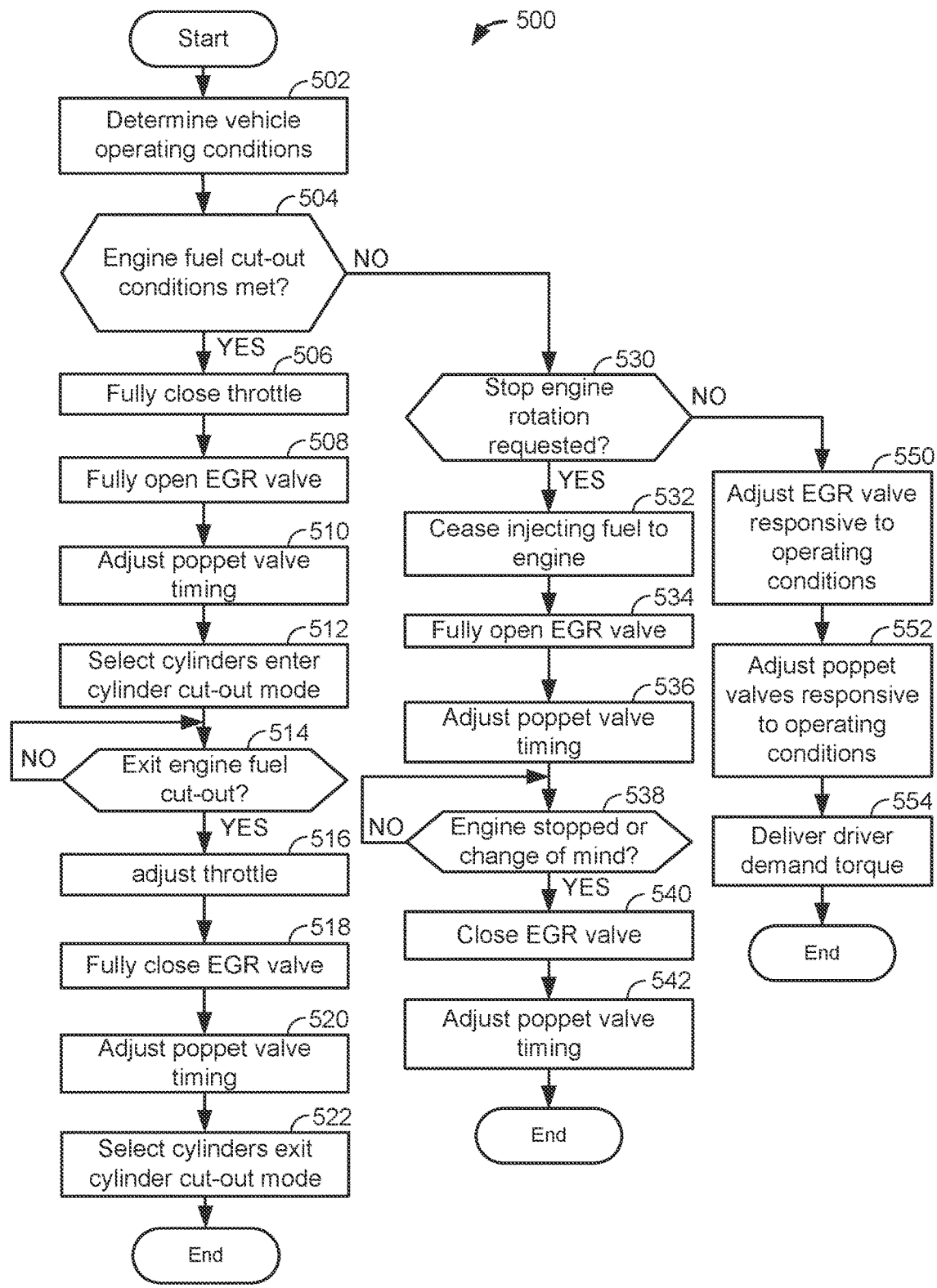
FIG. 5 shows an example method for operating an engine to improve after treatment efficiency and reduce fuel consumption.

The present description is related to operating an engine that may enter a fuel cut-off mode. In addition, the present description applies to engines that may be commanded to stop automatically or via a dedicated operator input. FIG. 1 shows one example of an internal combustion engine that may be operated according to the method of FIG. 5. The engine includes variable valve timing and a high pressure EGR valve and passage. The variable valve timing and high pressure EGR valve may be operated to reduce amounts of air and oxygen that may be pumped to an after treatment device via the engine. The engine may be configured with a single bank of cylinders as shown in FIG. 2 or two banks of cylinders as shown in FIG. 3. An example engine operating sequence according to the method of FIG. 5 is shown in FIG. 4. A method for operating an engine and reducing amounts of air and oxygen pumped to after treatment devices of an exhaust system is shown in FIG. 5.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake poppet valve 52 may be operated by a variable valve activating/deactivating actuator 59, which may be a cam driven valve operator (e.g., as shown in U.S. Pat. Nos. 9,605,603; 7,404,383; and 7,159,551 all of which are hereby fully incorporated by reference for all purposes). Likewise, exhaust poppet valve 54 may be operated by a variable valve activating/deactivating actuator 58, which may be a cam driven valve operator (e.g., as shown in U.S. Pat. Nos. 9,605,603; 7,404,383; and 7,159,551 all of which are hereby fully incorporated by reference for all purposes). Intake poppet valve 52 and exhaust poppet valve 54 may be deactivated and held in a closed position preventing flow into and out of cylinder 30 for one or more entire engine cycles (e.g. two engine revolutions) via activating/deactivating actuators 58 and 59, thereby deactivating cylinder 30. Flow of fuel supplied to cylinder 30 may also cease when cylinder 30 is deactivated. A phase of exhaust valve timing relative to crankshaft timing may be adjusted via phase actuator 84. Similarly, a phase of intake valve timing relative to crankshaft timing may be adjusted via phase actuator 85.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control.

Engine air intake system 9 may include an intake manifold 44, central throttle 62, turbocharger compressor 162, and air filter 42. Intake manifold 44 is shown communicating with optional central throttle 62 which adjusts a position of throttle plate 64 to control air flow from intake boost chamber 46. Turbocharger compressor 162 draws air from air filter 42 to supply boost chamber 46. Turbocharger compressor 162 is rotated by turbocharger turbine 164 via shaft 161. Exhaust gases may impart force to variable geometry vanes 163 to rotate shaft 161. Vane actuator 165 may adjust a position of vanes 163 to increase or decrease the efficiency of vanes 163. Thus, compressor speed may be adjusted via adjusting the position of vanes 163. Compressor recirculation valve 158 allows compressed air at the outlet 15 of compressor 162 to be returned to the inlet 17 of compressor 162. In this way, the efficiency of compressor 162 may be increased or reduced so as to affect the flow of compressor 162 and reduce the possibility of compressor surge. Arrows 5 show a direction of air flow through the engine when the engine is operating in a fuel cut-out mode or after a stop engine rotation request.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start or engine stop rotation may be requested by a driver or vehicle occupant via a dedicated human/machine interface (e.g., key switch, pushbutton, remote radio frequency emitting device, etc.) 69 that has a sole function of starting and stopping the engine. Alternatively, a stop engine rotation request or an engine start request may be automatically generated in response to vehicle operating conditions (e.g., brake pedal position, propulsion pedal position, battery SOC, etc.) via controller 12. Low voltage battery 8 may supply electrical power to starter 96. Controller 12 may monitor battery state of charge.

Combustion is initiated in the combustion chamber 30 via spark plug 66. Ignition system 88 may include coils and circuitry to provide electrical energy to spark plug 66. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

Engine exhaust gases may be processed via an exhaust system 11 that includes exhaust manifold and after treatment device 70 (e.g., a three-way catalyst, particulate filter, etc.). Exhaust gas recirculation (EGR) may be provided to the engine via high pressure EGR system 83. High pressure EGR system 83 includes valve 80 and EGR passage 81. EGR valve 80 is a valve that closes or allows exhaust gas to flow from upstream of emissions device 70 to a location in the engine air intake system downstream of compressor 162. EGR may be cooled via passing through an EGR cooler (not shown). EGR may also be provided via low pressure EGR system 75. Low pressure EGR system 75 includes EGR passage 77 and EGR valve 76. Low pressure EGR may flow from downstream of emissions device 70 to a location upstream of compressor 162. Low pressure EGR system 75 may include an EGR cooler 74, a cooler bypass passage 77a, and a low pressure cooler bypass valve 78. Low pressure cooler bypass valve 78 may be opened for gases to bypass cooler 74.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a propulsion pedal 130 for sensing propulsion position adjusted by human foot 132; a measurement of engine manifold pressure (MAP) from pressure sensor 121 coupled to intake manifold 44 (alternatively or in addition sensor 121 may sense intake manifold temperature); boost pressure from pressure sensor 122; exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by a spark generated at spark plug 66, or alternatively in diesel engines, via compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2, a first example configuration of engine 10 is shown. In this example, engine 10 includes a single cylinder bank 200 comprising four cylinders. The four cylinders are numerically indicated as 1-4. During a fuel cut-out mode, throttle 62 may be fully closed and air may be pumped from intake manifold 44, through cylinders 1-4, and into exhaust manifold 48. At least a portion of air in exhaust manifold may be returned to intake manifold 44 via high pressure EGR passage 81 as indicated by arrow 202. Air that is not returned to intake manifold 44 may exit engine 10 as indicated by arrow 204.

Referring now to FIG. 3, a second example configuration of engine 10 is shown. In this example, engine 10 includes a two cylinder banks 300 and 302 comprising eight cylinders. The eight cylinders are numerically indicated as 1-8. During a fuel cut-out mode, throttle 62 may be fully closed and air may be pumped from intake manifold 44, through cylinders 5-8, and into exhaust manifold 48b. At least a portion of air in exhaust manifold may be returned to intake manifold 44 via high pressure EGR passage 81 as indicated by arrow 304. Air that is not returned to intake manifold 44 may exit engine 10 and after treatment device 70b as indicated by arrow 306. Intake and exhaust valves of cylinders 1-4 may be held closed during an entire cycle of engine 10 so that air and oxygen are not pumped to after treatment device 70a. In examples where poppet valves in cylinders 1-4 may not be held closed over an entire engine cycle, a portion of air and oxygen in intake manifold 44 may exit engine 10 as indicated by arrow 308.

The system of FIGS. 1-3 provides for an engine system, comprising: an engine including a high pressure exhaust gas recirculation (EGR) valve and poppet valves; and a controller including executable instructions stored in non-transitory memory that cause the controller to open the high pressure EGR valve and adjust timing of the poppet valves in response to a stop engine rotation request. The engine system includes where the adjusting timing of the poppet valves includes retarding an intake valve closing timing. The engine system further comprises additional instructions to fully close the high pressure EGR valve in response to the engine not rotating. The engine system further comprises additional instructions to fully close the high pressure EGR valve in response to an operator change of mind. The engine system further comprises additional instructions to fully open the high pressure EGR valve and adjust timing of the poppet valves in response to releasing a propulsion pedal. The engine system further comprises additional instructions to fully open the high pressure EGR valve and adjust timing of the poppet valves in response to vehicle speed. The engine system further comprises additional instructions to cease fuel flow to the engine in response to the stop engine rotation request.

Referring now to FIG. 4, an example prophetic engine operating sequence for an engine is shown. The operating sequence of FIG. 4 may be produced via the system of FIGS. 1-3 executing instructions according to the method described in FIG. 5. The plots of FIG. 4 are aligned in time and occur at the same time. Vertical markers at t0-t5 indicate times of particular interest during the sequence.

The first plot from the top of FIG. 4 represents engine state versus time. Trace 402 represents engine state and the engine is off and not rotating when trace 402 is at a low level near the horizontal axis. The engine is on and receiving fuel, combusting the fuel or at least attempting to combust the fuel when trace 402 is at a higher level near the vertical axis arrow. The vertical axis represents engine state. The engine is in fuel cut-out mode where the engine rotates without receiving fuel and combusting the fuel when trace 402 is at a middle level of the vertical axis. The vertical axis represents engine state. The horizontal axis represents time and time increases from the left side to right side of the figure.

The second plot from the top of FIG. 4 represents EGR valve position versus time. Trace 404 represents the EGR valve position. The vertical axis represents EGR valve position and the EGR valve is fully open when trace 404 is near the label FO along the vertical axis. The EGR valve is fully closed when trace 404 is near the label FC along the vertical axis. The horizontal axis represents time and time increases from the left side to right side of the figure.

The third plot from the top of FIG. 4 represents central throttle position versus time. Trace 406 represents the central throttle state. The vertical axis represents central throttle state and the central throttle is fully open when trace 406 is near the label FO along the vertical axis. The central throttle is fully closed when trace 406 is near the label FC along the vertical axis. The horizontal axis represents time and time increases from the left side to right side of the figure.

The fourth plot from the top of FIG. 4 represents intake valve closing (IVC) position versus time. Trace 408 represents the IVC position. The vertical axis represents IVC position and the IVC is advanced when trace 408 is near the label Adv. along the vertical axis. The IVC is retarded when trace 408 is near the label Ret. along the vertical axis. The horizontal axis represents time and time increases from the left side to right side of the figure.

The fifth plot from the top of FIG. 4 represents propulsion pedal position versus time. Trace 410 represents the propulsion pedal position and the propulsion pedal is fully applied when trace 401 is near the label FA along the vertical axis. The propulsion pedal is fully returned when trace 410 is near the label FR along the vertical axis. The horizontal axis represents time and time increases from the left side to right side of the figure.

At time t0, the engine is on and combusting fuel. The EGR valve is partially open and the central throttle is partially open. The IVC timing is partially advanced and the propulsion pedal is partially applied. Such operating conditions may be present when a vehicle is traveling on a road at a cruising speed.

At time t1, the engine enters a fuel cut-out mode where the engine rotates without fuel being supplied to the engine. The engine may continue to rotate as a vehicle's kinetic energy is transferred from the vehicle's wheels to the engine. All engine cylinders may be deactivated when the engine is operating in the fuel cut-out mode via ceasing to supply fuel to the engine cylinders. The EGR valve is fully opened in response to the engine entering the fuel cut-off mode and the central throttle is also fully closed in response to the engine entering the fuel cut-off mode. Closing the central throttle and fully opening the EGR valve may reduce the amount of air and oxygen that is pumped by the engine to the exhaust after treatment devices. The IVC timing is also retarded so that the amount of air entering engine cylinders from the intake manifold may be reduced. The propulsion pedal is shown fully released. The engine may enter the fuel cut-off mode based on driver demand torque and vehicle speed. The driver demand torque may be determined from the propulsion pedal position and vehicle speed. For example, a table or function of empirically determined driver demand torque values may be indexed or referenced via vehicle speed and propulsion pedal position. The table or function outputs the driver demand torque. Values in the table or function may be determined via operating the vehicle on a dynamometer and adjusting values in the table until a desired level of vehicle performance is provided for a particular propulsion pedal position and vehicle speed. The engine remains in fuel cut-out mode between time t1 and time t2.

At time t2, the propulsion pedal is applied by the vehicle driver (not shown) to increase the driver demand torque causing the engine to exit fuel cut-out mode and reactivate. The EGR valve is partially closed so that a desired amount of EGR may be provided to engine cylinders. The central throttle is opened so that air may be provided to the engine. The increase in air flow to the engine allows the engine to generate the driver demand torque. The IVC timing is advanced so that greater amounts of air may enter engine cylinders so that engine torque output may be increased. Shortly after the EGR valve is closed, the engine exits fuel cut-out mode and begins combusting fuel.

At time t3, the vehicle driver (not shown) fully releases the propulsion pedal and the engine continues to combust fuel and rotate. The EGR valve is partially open and the central throttle closes as the propulsion pedal is released. The IVC timing begins to be retarded in response to the propulsion pedal being fully released.

At time t4, a stop engine rotation request (not shown) is issued and the EGR valve is fully opened in response to the stop engine rotation request. The central throttle remains closed and IVC timing is retarded further. The propulsion pedal remains released. The fuel supply to the engine (not shown) is also cut-off so that the engine speed starts to decrease (not shown).

At time t5, engine speed reaches zero and the EGR valve is fully closed in response to the engine speed reaching zero. The IVC timing is also advanced in preparation for a subsequent engine start. The central throttle remains closed and the propulsion pedal remains fully released.

In this way, flow of air and oxygen to a catalyst may be reduced when stopping engine rotation is requested and when an engine enters a fuel cut-out mode.

Referring now to FIG. 5, a method for operating an engine is shown. In particular, a flowchart of a method for operating an internal combustion engine is shown. The method of FIG. 5 may be stored as executable instructions in non-transitory memory in systems such as shown in FIGS. 1-3. The method of FIG. 5 may be incorporated into and may cooperate with the systems of FIGS. 1-3. Further, at least portions of the method of FIG. 5 may be incorporated as executable instructions stored in non-transitory memory while other portions of the method may be performed via a controller transforming operating states of devices and actuators in the physical world. The controller may employ engine actuators of the engine system to adjust engine operation, according to the method described below. Further, method 500 may determine selected control parameters from sensor inputs.

At 502, method 500 determines vehicle operating conditions. Vehicle operating conditions may include but are not limited to engine temperature, propulsion pedal position, ambient temperature, engine starting requests, stop engine rotation requests, vehicle speed, ambient pressure, driver demand torque, and engine speed. Vehicle operating conditions may be determined via vehicle sensors and the engine controller described in FIG. 1. Method 500 proceeds to 504.

At 504, method 500 judges if conditions are present for the engine to enter a fuel cut-out mode. In one example, method 500 may enter a fuel cut-out mode when driver demand torque as determined from propulsion pedal position is less than a threshold and vehicle speed is greater than a threshold. If method 500 judges that conditions are present for entering fuel cut-out mode, the answer is yes and method 500 proceeds to 506. Otherwise, the answer is no and method 500 proceeds to 530.

At 506, method 500 fully closes the engine throttle. Closing the engine throttle reduces air and oxygen flow to after treatment devices so that the after treatment devices may not become saturated with oxygen. In addition, closing the throttle may help to maintain a temperature of the after treatment device, which may help to maintain efficiency of the after treatment device. It should be noted that a small amount of air may pass through the engine even though the engine throttle is fully closed since fully closing the throttle may not provide an air tight seal. Method 500 proceeds to 508.

At 508, method 500 fully opens the high pressure EGR valve. By fully opening the high pressure EGR valve, at least a portion of air that may be pumped from the engine intake manifold to the engine exhaust manifold may be returned to the engine intake manifold, thereby reducing a flow of air and oxygen to the after treatment device in the exhaust system. Additionally, in some examples, method 500 may fully close vanes of a variable geometry turbocharger to restrict flow of air through the after treatment device. Method 500 proceeds to 510.

At 510, method 500 adjusts timing of engine poppet valves to reduce air flow through the engine's cylinders. In one example, timing of intake poppet valves may be retarded so that a portion of air that is drawn into engine cylinders may be ejected back into the engine intake manifold. The timing of a bank of cylinders may be adjusted in this way. In addition, if the engine is a V type engine, poppet valves of one bank of cylinders may be deactivated in a closed state so that the one bank of cylinders may enter a cylinder cut-out mode where valves of the cylinders are deactivated. The timing of poppet valves of the second bank of cylinders may be retarded as previously described. The EGR valve may couple the exhaust manifold of the second bank of cylinders directly to the engine intake manifold as shown in FIG. 3 so that the air flow through the second bank of cylinders may be reduced. Method 500 proceeds to 512.

At 512, method 500 causes select cylinders to enter fuel cut-out mode. In one example, all engine cylinders may enter fuel cut-out mode if the engine includes a single bank of cylinders. For example, if the cylinder is a four cylinder engine, four cylinders of the engine may stop receiving fuel while poppet valves of the selected cylinders continue to operate. In addition, if the engine includes two banks of cylinders, then some of the cylinders may enter a cylinder cut-out mode where poppet valves of these cylinders are held closed during an entire cycle of the engine (e.g., two engine revolutions). Fuel delivery to cylinders that are in a cylinder cut-out mode also ceases. Method 500 proceeds to 514.

At 514, method 500 judges if conditions are present to exit fuel cut-out mode and cylinder cut-out mode. In one example, method 500 may judge that conditions are present to exit fuel cut-out mode and cylinder cut-out mode if driver demand torque is greater than a threshold torque. If method 500 judges that conditions are present to exit fuel cut-out mode and cylinder cut-out mode, then the answer is yes and method 500 proceeds to 516. Otherwise, the answer is no and method 500 returns to 514.

At 516, method 500 adjusts a position of the throttle to supply air to meet the requested driver demand torque. In addition, if vanes of a variable geometry turbocharger where previously closed, they may be opened to increase compressor speed to meet driver demand torque. Method 500 proceeds to 518.

At 518, method 500 at least partially closes the high pressure EGR valve. In some examples, the high pressure EGR valve may be fully closed. The high pressure EGR valve is at least partially closed so that the engine cylinders may not receive EGR amounts that may cause engine misfire when the engine cylinders are reactivated. Method 500 proceeds to 520.

At 520, method 500 adjusts poppet valve timing. In one example, method 500 may advance IVC timings so that engine cylinders may induct larger air amounts so that the engine may generate torque and have good combustion stability. Method 500 proceeds to 522.

At 522, method 500 exits cylinders that are operating in fuel cut-out mode by reactivating these cylinders. These cylinders may be reactivated via injecting fuel to the cylinders and combusting the fuel. In addition, method 500 may exit cylinders from cylinder cut-out mode if any are presently in cylinder cut-out mode. The cylinders may exit cylinder cut-out mode via opening and closing intake and exhaust valves of the cylinders and injecting fuel to the cylinders. Method 500 proceeds to exit.

At 530, method 500 judges if stopping of engine rotation is requested. Stopping of engine rotation may be requested via a vehicle operator when the vehicle operator intends to leave the proximity of the vehicle or when the vehicle operator does not intend to move the vehicle for an extended period of time. Alternatively, stopping of engine rotation may be automatically (e.g., without a vehicle operator supplying input to a dedication device that has a sole purpose of starting and stopping rotation of the engine) requested via an engine controller in response to vehicle operating conditions. For example, stopping of engine rotation may be requested when driver demand torque is less than a threshold and vehicle speed is less than a threshold. If method 500 judges that stopping of engine rotation is requested, the answer is yes and method 500 proceeds to 532. Otherwise, the answer is no and method 500 proceeds to 550.

At 532, method 500 ceases injecting fuel to the engine to stop engine rotation. Method 500 proceeds to 534.

At 534, method 500 fully opens the high pressure EGR valve. The high pressure EGR valve is opened during stopping of engine rotation so that air entering the engine after fuel injection ceases may be recirculated back to the engine intake manifold so that less excess air and oxygen may reach the exhaust system after treatment device. By lowering the amount of air that reaches the after treatment device during engine stopping, it may be possible to restart the engine and reactivate the after treatment device by supplying less fuel to the engine and/or after treatment device. Consequently, fuel consumption may be reduced and the after treatment device may be reactivated sooner so that engine emissions may be converted more efficiently sooner. In addition, method 500 may close vanes of a variable geometry turbocharger to further reduce air flow to the after treatment device. Method 500 proceeds to 536 after opening the EGR valve.

At 536, method 500 adjusts timing of engine poppet valves to reduce air flow through the engine's cylinders as the engine coasts to a stop. In one example, timing of intake poppet valves may be retarded so that a portion of air that is drawn into engine cylinders may be ejected back into the engine intake manifold. Method 500 proceeds to 538.

At 538, method 500 judges if the engine has stopped rotating or if the vehicle driver has indicated a change of mind. The change of mind may include changing one's mind from stopping engine rotation to propelling the vehicle. For example, if vehicle speed reaches zero and the propulsion pedal is not applied, the engine controller may begin a stop engine rotation sequence automatically. The stop engine rotation sequence may include stopping fuel flow to the engine. However, the engine may continue to rotate while fuel that was already injected to the engine before the stop engine rotation sequence is combusted. If the vehicle's driver applies the propulsion pedal while the engine is still rotating, the application of the propulsion pedal may be interpreted as a change of mind condition. The engine may be reactivated by commencing fuel injection and spark to the engine in response to the change of mind so that the vehicle speed may increase according to the driver demand. If method 500 judges that the engine has stopped rotating or a change of mind has occurred, the answer is yes and method 500 proceeds to 540. Otherwise, the answer is no and method 500 returns to 538.

At 540, method 500 at least partially closes the high pressure EGR valve. In some examples, method 500 may fully close the high pressure EGR valve. By closing the EGR valve, the engine may be restarted without inducting more EGR than may be desired. Method 500 proceeds to 542.

At 542, method 500 adjusts poppet valve timing. In one example, IVC timing may be advance so that the engine's cylinders may be induct sufficient air to support stable combustion in the engine. IVC timing may be adjusted to a timing that is desirable for starting the engine. Method 500 proceeds to exit.

At 550, method 500 adjusts the EGR valve in response to engine operating conditions (e.g., engine speed and engine load). In one example, method 500 references a table of empirically determined EGR flow rates that are based on engine speed and engine load. The position of the EGR valve is adjusted to provide the EGR rate that is output by the table. Method 500 proceeds to 552.

At 552, method 500 adjusts the poppet valve timing in response to engine operating conditions (e.g., engine speed and engine load). In one example, method 500 references a table of empirically determined poppet valve timings that are based on engine speed and engine load. The timing of the poppet valves may be adjusted to provide a desired volumetric efficiency and internal EGR. Method 500 proceeds to 554.

At 554, method 500 commands the engine to provide the requested driver demand torque. The requested driver demand torque may be provided via adjusting one or more torque actuators of the engine. For example, method 500 may adjust throttle position, spark timing, and fuel injection amount so that the engine may generate the requested driver demand torque. Method 500 proceeds to exit.

In this way, poppet valve timing and EGR valve state may be adjusted to reduce an amount of air and oxygen that may be pumped by an engine to an after treatment device. By lowering the amount of air that is pumped to the after treatment device, it may be possible to reduce an amount of fuel used to reactivate the after treatment device. Thus, engine fuel consumption may be reduced.

Thus, the method of FIG. 5 provides for an engine operating method, comprising: adjusting intake valve closing timing and opening an exhaust gas recirculation valve via a controller in response to an engine entering a fuel cut-out mode. The engine method includes where adjusting intake valve closing timing includes retarding intake valve closing timing and further comprises operating a first cylinder bank in a cylinder cut-out mode while the exhaust gas recirculation valve is open and valve timing of the second cylinder bank is retarded, and where the exhaust gas recirculation valve selectively enables and disables communication between an intake manifold of the engine and an exhaust manifold of the second cylinder bank. The engine method further comprises entering the engine in the fuel cut-out mode in response to releasing a propulsion pedal. The engine method includes where the exhaust gas recirculation valve is a high pressure exhaust gas recirculation valve. The engine method further comprises closing the exhaust gas recirculation valve before exiting the engine from the fuel cut-out mode. The engine method further comprises adjusting intake valve timing in response to at least one of propulsion pedal position, engine speed, or vehicle speed before exiting the engine from the fuel cut-out mode. The engine method further comprises opening an engine throttle before exiting the engine from the fuel cut-out mode. The engine method further comprises closing vanes of a variable geometry turbocharger in response to the engine entering the fuel cut-out mode.

The method of FIG. 5 also provides for an engine operating method, comprising: adjusting intake valve closing timing and opening an exhaust gas recirculation valve via a controller in response to a stop engine rotation request. The engine method includes where adjusting intake valve closing timing includes retarding intake valve closing timing. The engine method includes where opening the exhaust gas recirculation valve includes fully opening the exhaust gas recirculation valve. The engine method further comprises fully closing the exhaust gas recirculation valve in response to a change of mind. The engine method includes where the change of mind is indicated via applying a propulsion pedal.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
adjusting intake valve closing timing and closing an exhaust gas recirculation valve of an engine via a controller in response to an engine exiting a fuel cut-out mode.

2. The engine method of claim 1, further comprising adjusting a throttle of the engine in response to exiting the fuel cut-out mode, the throttle adjusted to meet a driver demand torque.

3. The engine method of claim 1, where adjusting intake valve closing timing includes advancing intake valve closing timing.

4. The engine method of claim 1, further comprising activating one or more cylinders via injecting fuel to the one or more cylinders in response to the an engine exiting the fuel cut-out mode.

5. The engine method of claim 1, where the exhaust gas recirculation valve is included in a high pressure exhaust gas recirculation system.

6. The engine method of claim 1, where the exhaust gas recirculation valve is included in a low pressure exhaust gas recirculation system.

7. The engine method of claim 1, where the engine exits the fuel cut-out mode in response to a position of a pedal.

8. The engine method of claim 1, where the exhaust gas recirculation valve is partially closed.

9. An engine system, comprising:
an engine including a high pressure exhaust gas recirculation (EGR) valve and poppet valves; and
a controller including executable instructions stored in non-transitory memory that cause the controller to close the high pressure EGR valve and adjust timing of the poppet valves in response a pedal being applied while the engine is rotating without being fueled following an engine stop rotation request.

10. The engine system of claim 9, where the adjusting timing of the poppet valves includes advancing an intake valve closing timing.

11. The engine system of claim 9, further comprising additional instructions to inject fuel to the engine in response to the pedal being applied.

12. The engine system of claim 9, where the high pressure EGR valve is fully closed in response to the pedal being applied.

13. The engine system of claim 9, further comprising additional instructions to cease injecting fuel to the engine in response to the engine stop rotation request.

14. The engine system of claim 9, further comprising additional instructions to fully open the high pressure EGR valve in response to the engine stop rotation request.

15. The engine system of claim 9, a turbocharger coupled to the engine.

16. An engine operating method, comprising:
closing a fully open exhaust gas recirculation valve of an engine in response to the engine ceasing to rotate following an engine stop rotation request.

17. The engine method of claim 16, further comprising adjusting intake valve closing timing.

18. The engine method of claim 16, where closing the fully open exhaust gas recirculation valve includes fully closing the exhaust gas recirculation valve.

19. The engine method of claim 16, further comprising ceasing to inject fuel to the engine in response to the engine stop rotation request.

20. The engine method of claim 16, further comprising fully opening the exhaust gas recirculation valve in response to the engine stop rotation request.

\* \* \* \* \*